(12) United States Patent
Laramee et al.

(10) Patent No.: US 11,608,189 B2
(45) Date of Patent: Mar. 21, 2023

(54) MULTISTAGE INFRARED SUPPRESSION EXHAUST SYSTEM

(71) Applicants: Bell Textron Inc., Fort Worth, TX (US); General Electric Company, Schenectady, NY (US)

(72) Inventors: Robert Michael Laramee, Fort Worth, TX (US); Michael E. Rinehart, Euless, TX (US); William Steyer, Topsfield, MA (US)

(73) Assignee: TEXTRON INNOVATIONS INC, Providence, RI (US)

( * ) Notice: Subject to any disclaimer, the term of this patent is extended or adjusted under 35 U.S.C. 154(b) by 0 days.

(21) Appl. No.: 16/990,688

(22) Filed: Aug. 11, 2020

(65) Prior Publication Data

US 2022/0048640 A1 Feb. 17, 2022

(51) Int. Cl.
| | |
|---|---|
| *B64D 33/04* | (2006.01) |
| *F02C 7/18* | (2006.01) |
| *F02K 1/38* | (2006.01) |
| *F02K 1/82* | (2006.01) |
| *F02K 1/36* | (2006.01) |
| *F02C 7/141* | (2006.01) |

(52) U.S. Cl.
CPC ............... *B64D 33/04* (2013.01); *F02C 7/18* (2013.01); *F02K 1/36* (2013.01); *F02K 1/386* (2013.01); *F02K 1/825* (2013.01); *B64D 2033/045* (2013.01); *F02C 7/141* (2013.01); *F05D 2220/329* (2013.01); *F05D 2260/232* (2013.01)

(58) Field of Classification Search
CPC .................. F02K 1/825; F02K 1/28–52; F02K 1/78–827; B64D 2033/045; B64D 2033/0213; B64D 2013/0611; B64D 2041/002; B64D 2027/026; B64D 33/04–06; F02C 6/00; F02C 6/02; F02C 6/04–20
See application file for complete search history.

(56) References Cited

U.S. PATENT DOCUMENTS

| | | |
|---|---|---|
| 3,210,934 A | 10/1965 | Smale |
| 3,628,885 A | 12/1971 | Sidenstick et al. |

(Continued)

OTHER PUBLICATIONS

W .R . Davis Engineering Ltd., "IRSS—Centre Body Tailpipe (CBT)" Product Data Sheet, Full View Angle IR Protection for the Bell 205/UH-1H, 2 pages; www.davis-eng.on.ca.

(Continued)

*Primary Examiner* — Stephanie Sebasco Cheng
(74) *Attorney, Agent, or Firm* — Akona IP

(57) ABSTRACT

One embodiment includes a multistage infrared suppression exhaust system for an aircraft, including: a stage one including a first exhaust conduit to receive a first exhaust air flow at a first temperature-pressure product $T_1P_1$, a second exhaust conduit to receive a second exhaust air flow at a second temperature-pressure product $T_2P_2$, and a flow integrator mechanically configured to mix the first exhaust air flow with the second exhaust air flow in an integration chamber while preventing back flow into the second exhaust conduit; and a stage two including a stage two cooling airflow to cool the mixed first and second exhaust air flows.

28 Claims, 9 Drawing Sheets

(56) References Cited

U.S. PATENT DOCUMENTS

| | | | |
|---|---|---|---|
| 3,693,880 A | 9/1972 | Versaw et al. | |
| 3,710,890 A | 1/1973 | True et al. | |
| 3,817,030 A | 6/1974 | Renius et al. | |
| 3,921,906 A | 11/1975 | Nye et al. | |
| 3,926,373 A | 12/1975 | Viets | |
| 3,930,627 A | 1/1976 | Miller | |
| 3,981,143 A | 9/1976 | Ross et al. | |
| 3,981,448 A | 9/1976 | Demogenes et al. | |
| 4,002,024 A | 1/1977 | Nye et al. | |
| 4,004,416 A | 1/1977 | Amelio et al. | |
| 4,007,587 A | 2/1977 | Banthin et al. | |
| 4,018,046 A | 4/1977 | Hurley | |
| 4,095,417 A | 6/1978 | Banthin | |
| 4,136,518 A | 1/1979 | Hurley et al. | |
| 4,198,817 A | 4/1980 | Fujita et al. | |
| 4,215,537 A | 8/1980 | Hurley | |
| 4,291,530 A | 9/1981 | Ballard | |
| 4,295,332 A * | 10/1981 | Steyer | B64D 33/04 239/127.3 |
| 4,312,480 A | 1/1982 | Miller | |
| 4,414,441 A | 11/1983 | Perry et al. | |
| 4,566,270 A | 1/1986 | Ballard et al. | |
| 4,800,715 A | 1/1989 | Conway | |
| 5,699,965 A * | 12/1997 | Amelio | F02K 1/825 239/265.17 |
| 5,746,047 A * | 5/1998 | Steyer | F02K 1/825 60/39.5 |
| 5,992,140 A * | 11/1999 | Hammond | F02K 1/386 60/262 |
| 6,016,651 A * | 1/2000 | Hammond | F02K 1/48 239/265.17 |
| 6,055,804 A * | 5/2000 | Hammond | F02K 1/825 239/265.17 |
| 6,122,907 A * | 9/2000 | Frawley | F02K 1/825 239/265.17 |
| 6,134,879 A * | 10/2000 | Frawley | B64D 33/04 239/265.17 |
| 6,253,540 B1 * | 7/2001 | Chew | F02K 1/825 181/213 |
| 6,988,674 B2 * | 1/2006 | Steyer | B64D 33/04 239/265.19 |
| 7,313,909 B2 * | 1/2008 | Skoog | C23C 24/08 60/39.5 |
| 7,607,305 B2 * | 10/2009 | Steyer | F02K 1/48 60/770 |
| 7,607,306 B2 * | 10/2009 | Steyer | F02K 1/825 60/770 |
| 8,602,400 B2 | 12/2013 | Ward et al. | |
| 10,059,460 B2 * | 8/2018 | Dauriac | F02C 7/277 |
| 10,273,018 B2 * | 4/2019 | Pantalone, III | B64C 27/04 |
| 10,301,010 B2 | 5/2019 | Heverly | |
| 10,611,479 B1 | 4/2020 | Ivans | |
| 10,988,104 B2 * | 4/2021 | Williams | B60R 21/36 |
| 2018/0079384 A1 * | 3/2018 | Smith | C06D 5/02 |

OTHER PUBLICATIONS

W .R . Davis Engineering Ltd., "IRSS—Film Cooled Tailpipe (FCT)" Product Data Sheet, IR Signature Suppression for the Bell 212/412, 2 pages; www.davis-eng.on.ca.

* cited by examiner

MULTISTAGE INFRARED SUPPRESSION EXHAUST SYSTEM

TECHNICAL FIELD

This disclosure relates generally to aeronautical engineering, and more particularly, though not exclusively, to a system and method for providing a multistage infrared suppression exhaust system.

BACKGROUND

Aircraft engines for both rotary and fixed-wing aircraft generally operate at very high temperatures.

SUMMARY

In an example, there is disclosed a multistage infrared suppression exhaust system for an aircraft, comprising: a stage one comprising a first exhaust conduit to receive a first exhaust air flow at a first temperature-pressure product $T_1P_1$, a second exhaust conduit to receive a second exhaust air flow at a second temperature-pressure product $T_2P_2$, and a flow integrator mechanically configured to mix the first exhaust air flow with the second exhaust air flow in an integration chamber while minimizing back flow into the primary or second exhaust conduit; and a stage two comprising a stage two cooling airflow to cool the mixed first and second exhaust air flows.

DETAILED DESCRIPTION

Figure 1:
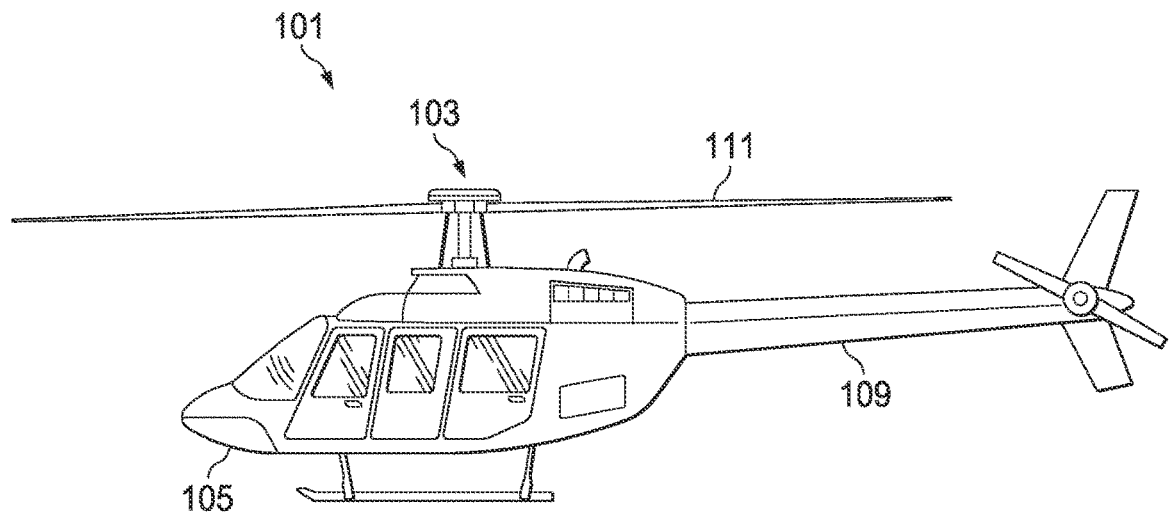
FIG. 1 illustrates an example embodiment of a rotorcraft.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached FIGURES.

Aircraft engines for both rotary and fixed-wing aircraft utilize ever increasing combustion operating temperatures for greater fuel economy and thermodynamic efficiency. As the engine operating temperatures increase, mechanisms may be provided to prevent the engine components and surrounding structure from breaking down by venting it away from the heat from the aircraft.

FIG. 1 illustrates an example embodiment of a rotorcraft 101. Rotary aircraft 101 could be modified with a multistage IRS exhaust system, as described herein.

Rotary aircraft 101 may be either a manned or an unmanned rotary aircraft. In some cases, rotary aircraft 101 could be electrically powered instead of powered by jet fuel. In those cases, rotary aircraft 101 could either be designed from the start with an in-air recharging system, or it could be modified after production with an aftermarket in-air recharging system.

In cases where rotary aircraft 101 is powered by jet fuel, it could be modified to serve as a tanker for in-air recharging of electrical aircraft such as electrically powered drones. For example, rotary aircraft 101 could include a generator that converts its jet fuel power into electrical power, and that electrical power could be shared with electrical aircraft such as drones.

The illustrated example portrays a side view of rotorcraft 101. Rotorcraft 101 includes a rotor system 103 with a plurality of rotor blades 111. The pitch of each rotor blade 111 can be managed or adjusted in order to selectively control direction, thrust, and lift of rotorcraft 101. Rotorcraft 101 further includes a fuselage 105 and a tail structure 109. In the illustrated embodiment, tail structure 109 may be used as a horizontal stabilizer. Torque is supplied to rotor system 103 using at least one engine.

In this illustration, rotor blades 111 form a motive subsystem, or in other words, a subsystem that provides the motive force to move the aircraft. The controls that manage or adjust the control direction form a control subsystem, which can include manual user controls, as well as computer augmentation to manual user control. Furthermore, in some embodiments, rotorcraft 101 may be an autonomous drone vehicle, or a remote-controlled drone vehicle, in which case some control functions are provided by a computer.

Figure 2:
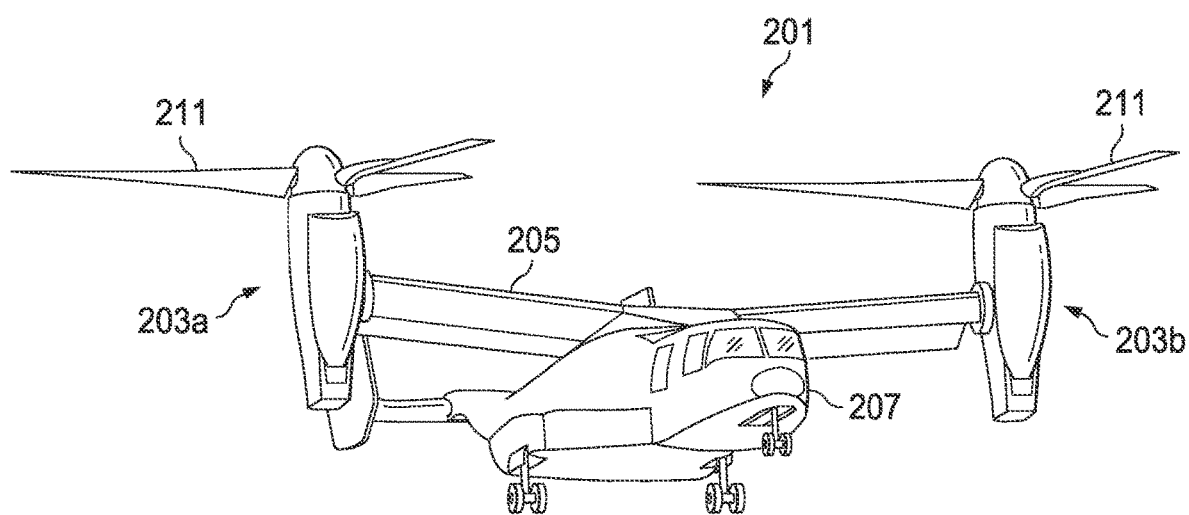
FIG. 2 illustrates a perspective view of an example tiltrotor aircraft.

FIG. 2 illustrates a perspective view of an example tiltrotor aircraft 201. Tiltrotor aircraft 201 could be modified with a multistage IRS exhaust system, as described herein.

Tiltrotor aircraft 201 may be either a manned or an unmanned rotary aircraft. In some cases, tiltrotor aircraft 201 could be electrically powered instead of powered by jet fuel. In those cases, tiltrotor aircraft 201 could either be designed from the start with an in-air recharging system, or it could be modified after production with an aftermarket in-air recharging system.

In cases where tiltrotor aircraft 201 is powered by jet fuel, it could be modified to serve as a tanker for in-air recharging of electrical aircraft such as electrically powered drones. For example, tiltrotor aircraft 201 could include a generator that converts its jet fuel power into electrical power, and that electrical power could be shared with electrical aircraft such as drones.

Tiltrotor aircraft 201 includes nacelles 203a and 203b, a wing 205, and a fuselage 207. Each nacelle 203a and 203b respectively includes a plurality of rotor blades 211. Moreover, each nacelle 203a and 203b may include an engine and gearbox for driving rotor blades 211. In some embodiments, nacelles 203a and 203b may each be configured to rotate between a helicopter mode, in which the nacelles 203a and 203b are approximately vertical, and an airplane mode, in which the nacelles 203a and 203b are approximately horizontal.

It should be appreciated that rotorcraft 101 of FIG. 1 and tiltrotor aircraft 201 of FIG. 2 are merely illustrative of a variety of aircraft that can be used to implement embodiments of the present disclosure. Other aircraft implementations can include, for example, fixed-wing airplanes, hybrid aircraft, unmanned aircraft, gyrocopters, a variety of helicopter configurations, and drones, among other examples. Moreover, it should be appreciated that even though aircraft are particularly well suited to implement embodiments of the present disclosure, the described embodiments can also be implemented using non-aircraft vehicles and devices.

In this illustration, rotor blades 211 form a motive subsystem, or in other words, a subsystem that provides the motive force to move the aircraft. The controls that manage or adjust the control direction form a control subsystem, which can include manual user controls, as well as computer augmentation to manual user control. Furthermore, in some embodiments, tiltrotor aircraft 201 may be an autonomous drone vehicle, or a remote-controlled drone vehicle, in which case some control functions are provided by a computer.

FIGS. 3-9 illustrate improvements to a rotorcraft, particularly with respect to the exhaust subsystem.

Because of the high energy requirements involved in the operation of aircraft, including rotary aircraft, combustion high temperatures are developed with the aircraft. This excess heat must be exhausted away from the aircraft as efficiently as possible. This is so, in the first place, because heat could damage the aircraft structure and cause catastrophic failure and loss of aircraft. For example, it is common for rotary aircraft rotors to turn in a clockwise direction. With the rotors turning in a clockwise direction, a port side exhaust vent will expel heated exhaust air, and the rotor wash from the rotors will sweep the heated exhaust away from the aircraft body, limiting exhaust plume interaction with the aircraft's structural elements. On the other hand, if the exhaust vent were located on the starboard side of the aircraft, the rotor wash would actually sweep the exhaust in toward the aircraft body, which could potentially cause heat damage to the body of the aircraft. Conversely, a counter-clockwise rotor rotational direction would result in the opposite assertions.

The exhaust profile of an aircraft may be even more important for a military aircraft. For example, an attack helicopter may burn high-grade aviation fuel at very high temperatures. But in a hostile environment, the high temperature exhaust can give the aircraft a very high infrared (IR) signature. This can be a problem, as many anti-aircraft weapons rely on this IR heat signature to track the aircraft and attack. It is therefore advantageous, particularly in a military aircraft, to minimize the IR signature as much as possible.

These issues may be further exacerbated when a secondary power unit (SPU) is provided on the aircraft. For example, an illustrative embodiment of a military attack helicopter includes both a primary engine and an SPU that acts as a secondary engine. The SPU may provide various auxiliary functions, including for example providing power while the aircraft is on the ground, providing auxiliary power in flight (particularly in embodiments requiring "high-hot hover" or high altitude, hot day and high speed cruise capabilities), and in some cases, even providing emergency rotor power to land the aircraft in case of a malfunction of the primary engine. Again, this can provide advantages in a hostile environment, where the primary engine may be disabled, but the SPU can still enable the flight crew to safely land the aircraft and survive an attack.

As with the primary engine, exhaust from the SPU needs to be vented from the aircraft without heating external aircraft components. However, venting exhaust from the SPU can provide difficulties with respect to weight, configuration, and IR signature. For example, if a separate exhaust system is provided on the starboard side of the aircraft, the rotor wash will tend to push the exhaust from the SPU in toward the body of the airframe. While the SPU may not run quite as hot as the primary engine (for example, the SPU exhaust may be as hot as the primary or several hundred degrees lower), the temperature may still be high enough to cause damage to the airframe. Also, an SPU exhaust introduces a secondary aircraft integration challenge besides the additional IR signature consideration to find an external location on either the port or starboard side due to other component installations. Furthermore, in an aircraft where mass is a premium consideration (such as in an attack helicopter that should be as light as possible to allow maximum airlift capacity), a second separate exhaust system for the SPU adds an undesirable mass. Furthermore, a second separate SPU exhaust provides another IR heat signature point on either the port or the starboard side of the aircraft, which increases the overall IR signature of the aircraft, and thus increases the danger in a hostile environment.

A multistage infrared suppression (IRS) exhaust system can provide a unitary exhaust solution that can handle exhaust from both first and second exhaust sources, such as a primary engine and an SPU, eliminating the integration problems, weight impacts, and IR signature implications of two individual exhaust systems.

However, simply dumping exhaust from both sources into a single chamber and venting may not achieve desired results. Mixing of the gases is influenced by multiple factors, including the respective temperatures, pressures, flow rates, and vector mechanics of the different exhaust flows. The mixing of two different moving gases can create complex fluid dynamics that are non-trivial to resolve.

A profile of the discrete exhaust flows can be characterized in various ways. In one example, exhaust flows may be characterized by vector mechanics, wherein a first flow has $$v_1 = \frac{dr_1}{dL}$$

with temperature $T_1$, and a second flow has $$v_2 = \frac{dr_2}{dL}$$

with temperature $T_2$. Theoretically, these two gas flows can be mixed to provide a temperature $T_3$, somewhere between $T_1$ and $T_2$. But the vector mechanics make this mixing nontrivial, and the gas with a higher velocity could provide back-pressure to the gas with the lower velocity.

In alternative analysis, the gases may be characterized by a product of temperature, pressure, and flow rate as corrected flow. For example, the exhaust from the main engine may be characterized by the product $T_1P_1$, where $T_1$ is the temperature of the exhaust from the primary engine, and $P_1$ is the pressure (or alternatively flow rate) of the exhaust from the primary engine. Similarly, exhaust from the SPU can be characterized by $T_2P_2$, where $T_2$ is the temperature of the exhaust from the SPU, and $P_2$ is the pressure (or flow rate) of the exhaust from the SPU.

Because the exhaust gases are at two different temperatures and pressures, the airflows do not readily mix. In most cases, $T_1 > T_2$, and $P_1 > P_2$, therefore $T_1P_1 > T_2P_2$. This is a difficulty not only because some equalization is required before the gases mix completely, but also because the extra pressure from the primary exhaust can cause back flow into the exhaust inlet for the SPU. Because back flow is a common measure of inefficiency, this can impede the operation of the SPU.

In a complex fluid dynamics system, all of the factors above, including temperature, pressure, flow rate, and vector dynamics, affect how readily gases mix, which presents difficulties when mixing exhaust gases from multiple sources. A unitary exhaust system may therefore be provisioned with multiple stages that enable the proper mixing and cooling of exhaust gases. Furthermore, the unitary exhaust system can be provided with IRS capabilities that help to reduce the overall IR signature of the aircraft.

In at least some embodiments, a multistage infrared suppression exhaust may be able to function with either primary exhaust or secondary power unit exhaust off due to an engine off condition.

Figure 3:
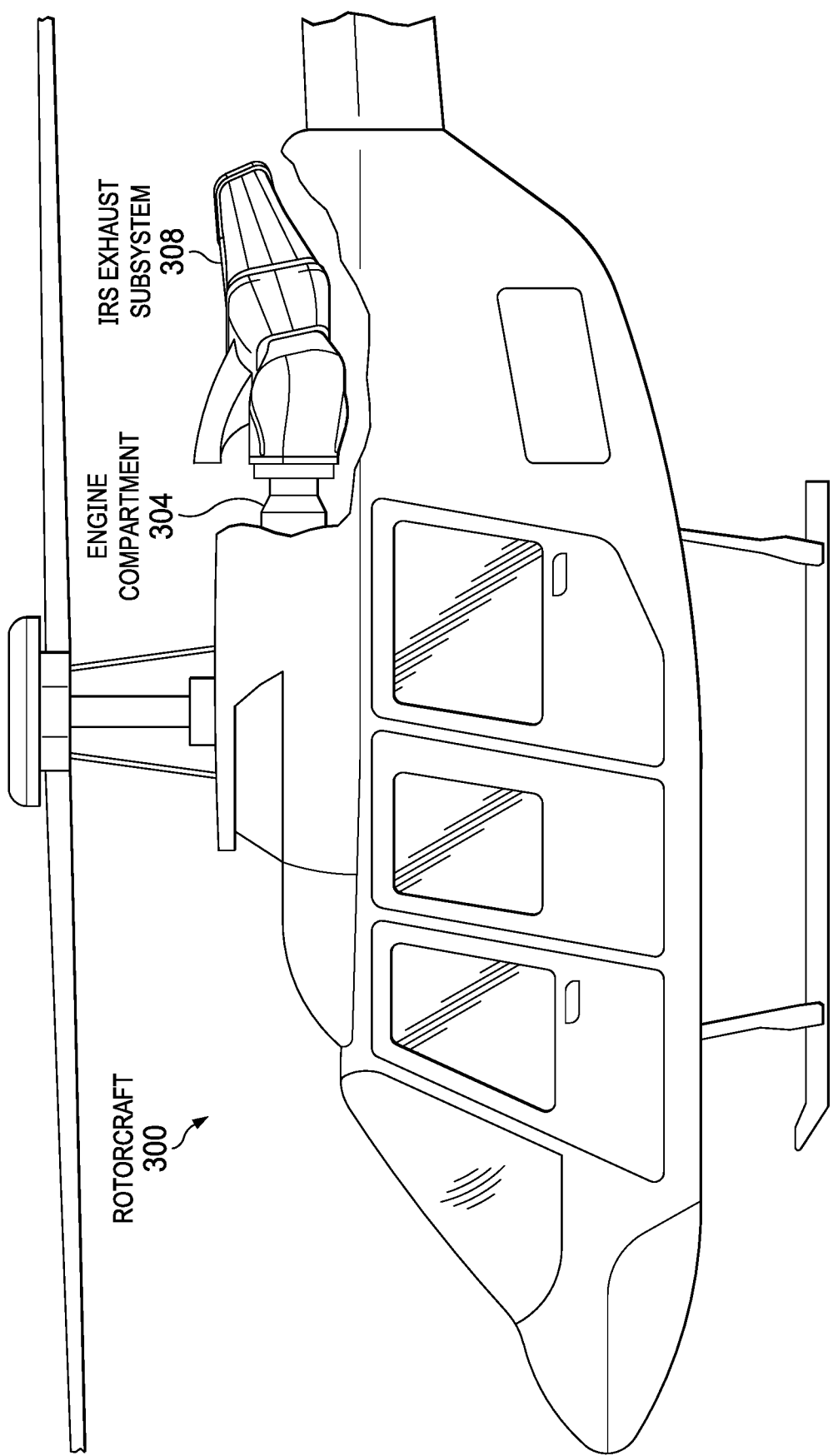
FIG. 3 illustrates an example multistage infrared suppression (IRS) exhaust system in situ on a rotary aircraft.

FIG. 3 Illustrates an example IRS exhaust system in situ on a rotary aircraft (or rotorcraft, 300). In this illustration, an engine compartment 304 holds one or both of the primary engine and the secondary engine (in some embodiments, a separate engine compartment (not shown) may be provided). Exhaust subsystem 308 may be a multistage IRS exhaust system according to the teachings herein, and may be configured to receive exhaust from both the primary and secondary engine.

FIGS. 4-6B illustrate a more detailed view of an illustrative embodiment of the multistage IRS exhaust system.

Figure 4:
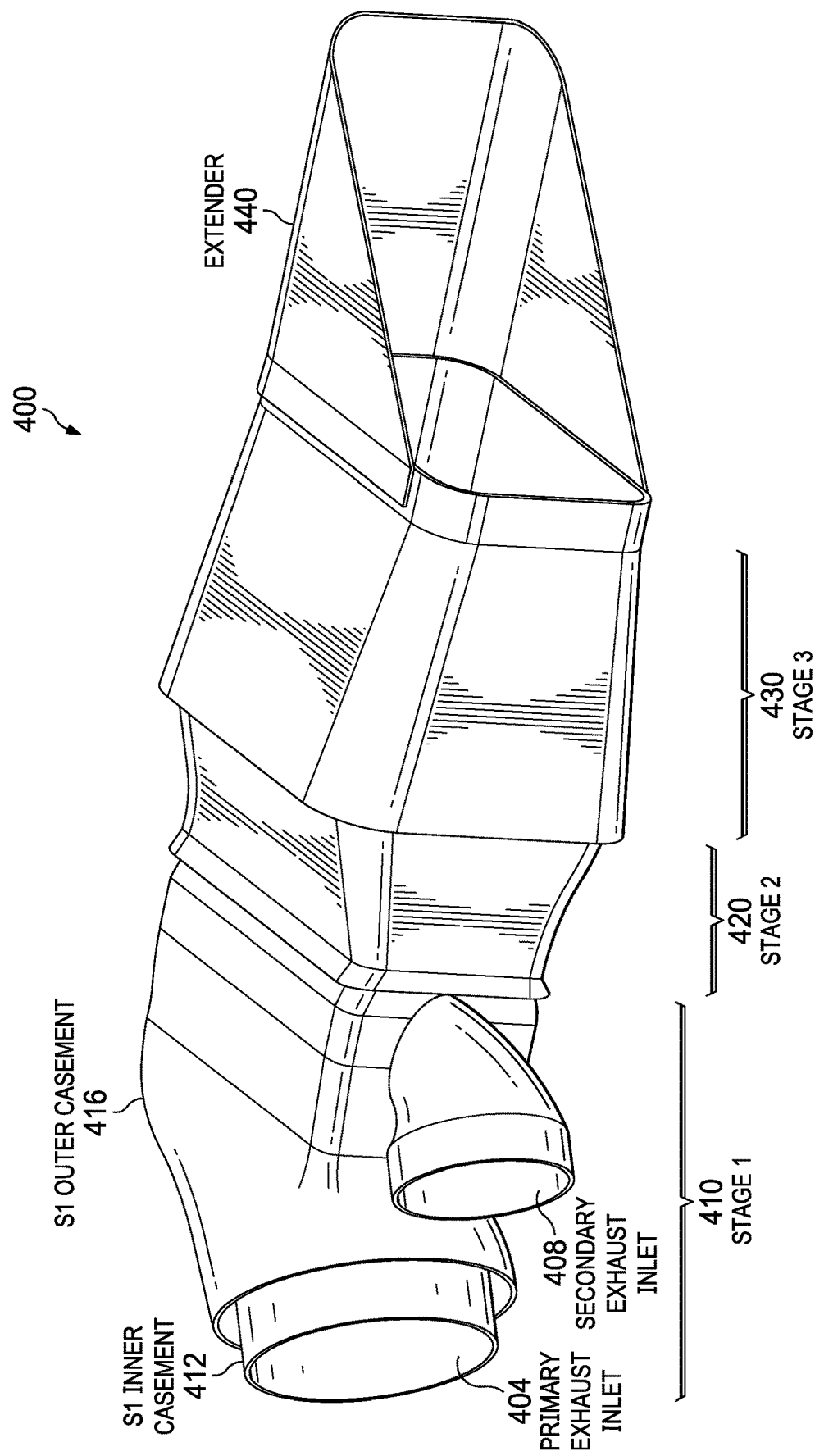
FIG. 4 illustrates three stages of an example IRS exhaust system.
Figure 5:
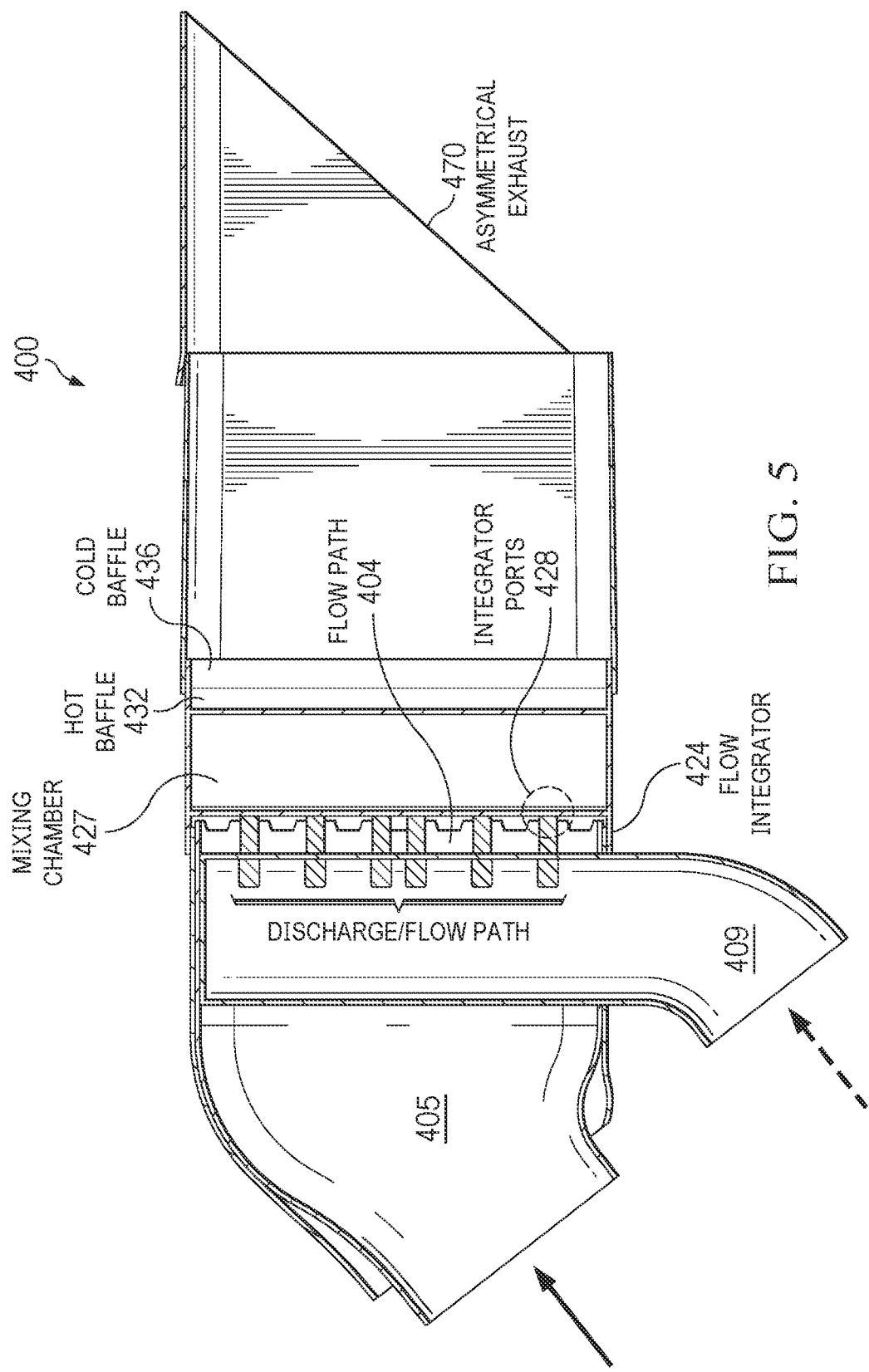
FIG. 5 illustrates additional cutaway details of an example multistage IRS exhaust system.
Figure 6A:
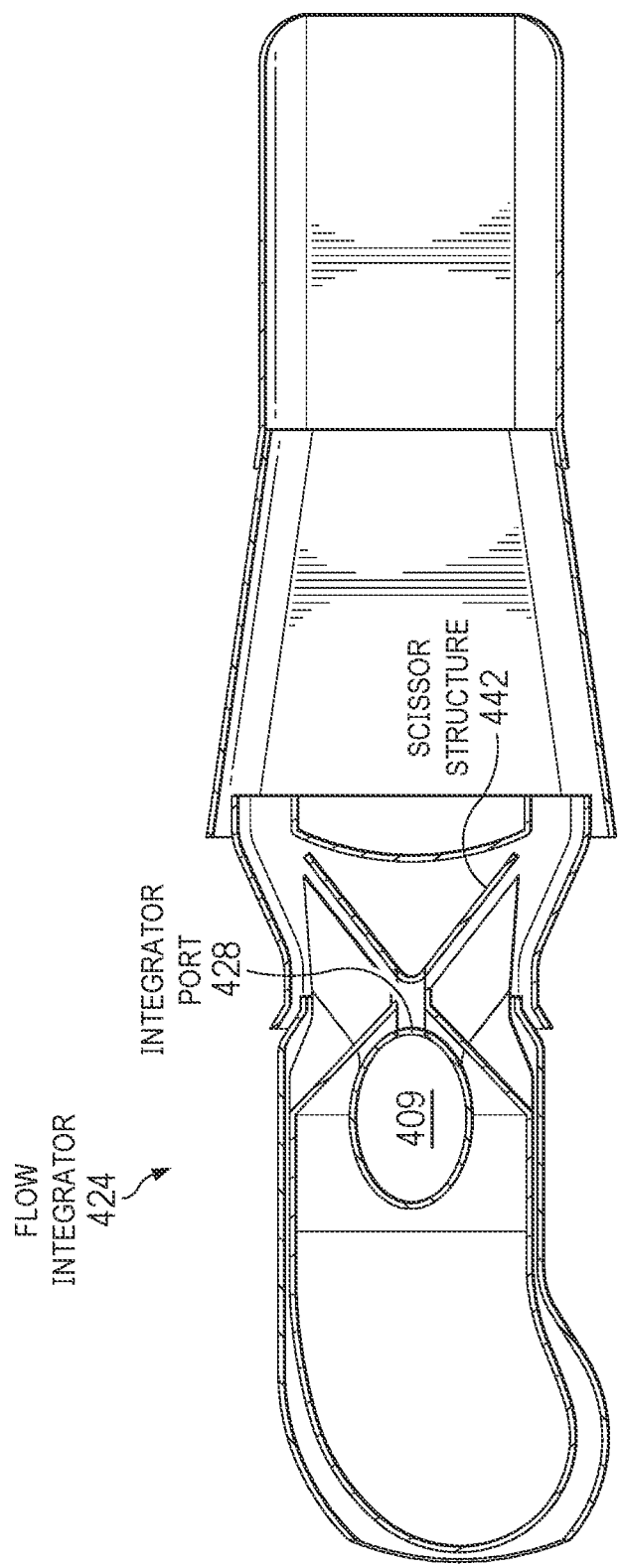
FIGS. 6A and 6B illustrate details of an example flow integrator.
Figure 6B:
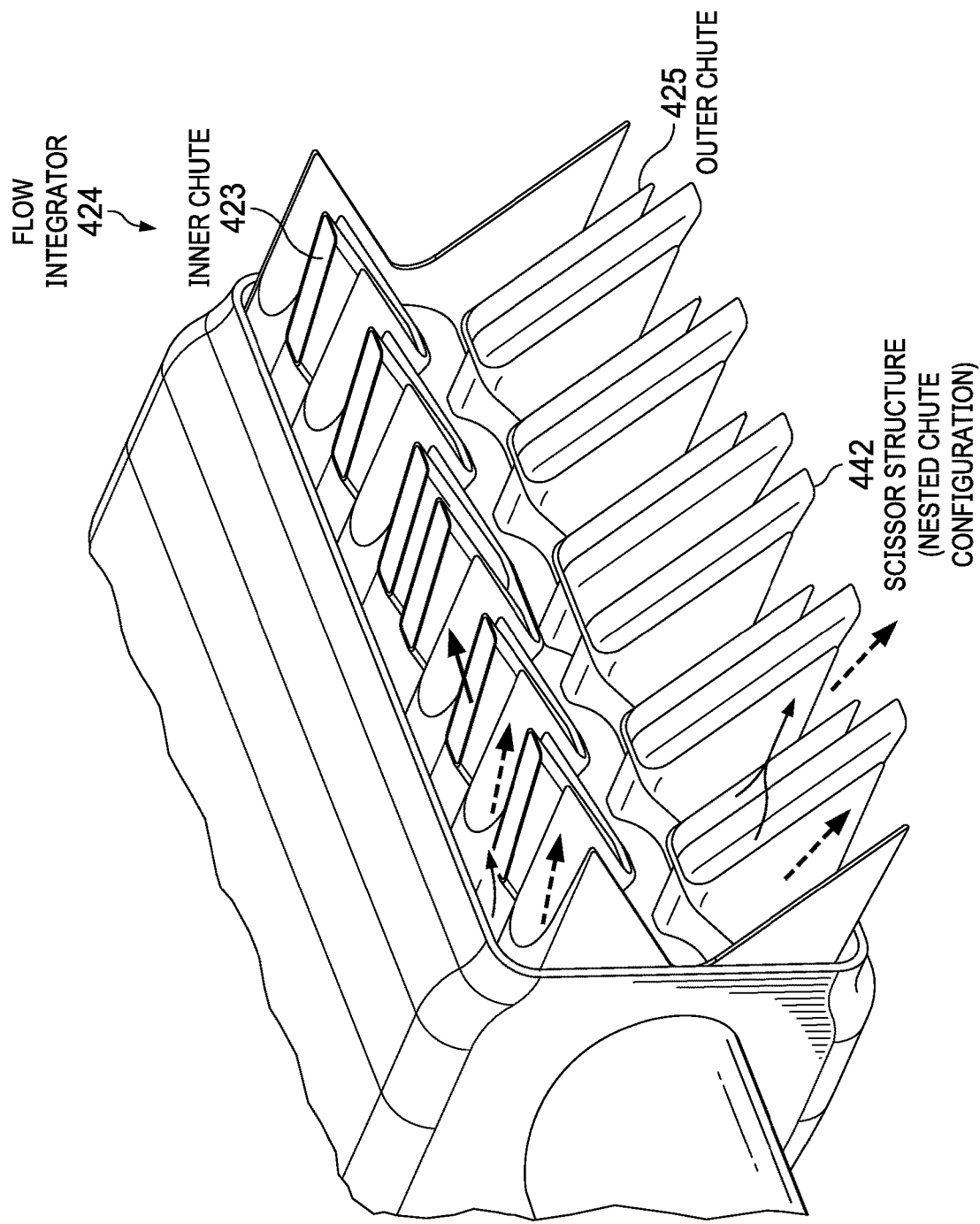

In FIG. 4, the three stages, namely stage 1 410, stage 2 420, and stage 3 430 are illustrated at a higher level. Stage 1 410 receives exhaust from a first and second exhaust air source, such as via a primary engine and SPU. Stage 1 410 includes a primary exhaust inlet 404 and a secondary exhaust inlet 408. Primary exhaust inlet 404 is mechanically adapted or configured to couple to the primary engine and receive therefrom primary exhaust with a temperature-and-pressure profile characterized as the temperature-pressure product $T_1P_1$. Similarly, secondary exhaust inlet 408 receives a second exhaust flow, such as from the SPU, characterized by the temperature-pressure product $T_2P_2$. The temperature and pressure differences of these two airflows mean that they cannot simply be dumped into a single chamber, particularly without provision to prevent back flows into the primary engine exhaust when the SPU is acting as an auxiliary power unit for ground operations. Thus, stage 1 410 includes exhaust integration means, an example of which is illustrated in FIGS. 5, 6A, and 6B.

Once exhaust gases are mixed in stage 1 410, they are partially cooled in stage 2 420. Between stage 1 410 and stage 2 420, the two discrete exhaust flows begin to mix and approach an intermediate temperature-pressure profile $T_3P_3$ that is somewhere between $T_1P_1$ and $T_2P_2$. Within stage 2 420, this intermediate gas may be mixed with a cooler air flow, such as air from an engine bay inlet. This cooler air is still somewhat hot, but may be much cooler and much lower-pressure than the air from the direct exhaust. In stage 2, exhaust with the temperature-pressure profile $T_4P_4$ mixes with the $T_3P_3$ intermediate exhaust air, and approaches yet another intermediate temperature-pressure profile $T_5P_5$.

In stage 3 430, exhaust may be mixed with yet cooler air from sources such as an ambient air inlet, and/or air from an integrated particle separator (IPS) or oil cooler. Stage 3 may also include elevated cooling air from internal bay areas, or cooling flow discharges from liquid cooling means, such as an oil cooler or environmental control systems that circumscribe stage 3, and carry yet more heat away from the aircraft via the exhaust. Finally, exhaust is expelled from stage 3 430 via extender 440.

If inverted from the present perspective view, multistage IRS exhaust system 400 may be affixed, for example, to the port side of a rotary aircraft, in which case the rotor wash will push the exhaust away from the airframe.

Also illustrated in this embodiment is an S1 inner casement 412, which forms the outer wall of primary exhaust inlet 404. An S1 outer casement 416 circumscribes S1 inner casement 412. This provides one aspect of IR suppression. For example, S1 inner casement 412 and S1 outer casement 416 may be situated so as to provide an air gap between the two casements. This air gap may mechanically couple to a lower temperature airflow, such as the airflow from the SPU bay or the primary engine bay, which is used in part in the cooling of stage 2 420. Not only does this provide a conduit for this cooler air to reach stage 2, but within stage 1 the cooler air provides an insulating layer around the higher temperature direct exhaust flow. This higher temperature direct exhaust flow would provide a much higher IR signature if exposed directly to the ambient environment. Because S1 outer casement 416 provides an insulating cooler air layer, the IR signature is substantially reduced.

FIG. 5 illustrates additional cutaway details of multistage IRS exhaust system 400. Visible in this view, secondary exhaust inlet 408 engages primary exhaust inlet 404 at a substantially perpendicular angle. As discussed above, secondary exhaust inlet 408 cannot simply "dump" exhaust into the same chamber with primary exhaust inlet 404. This would cause back flow into secondary exhaust inlet 408, which would reduce the efficiency of the SPU, and possibly even cause damage.

Therefore, the flows are integrated at the flow integrator 424 by allowing the primary flow 405 to flow over and around the secondary flow duct 409 and provide integrated flow between primary exhaust inlet 404 and secondary exhaust inlet 408. Flow integrator 424 integrates secondary exhaust into mixing chamber 427 via integrator ports 428, which direct secondary exhaust into discharge/flow path. Integrator ports 428 permit substantially one directional flow from secondary exhaust inlet 408 to mixing chamber 427, while minimizing back flow from mixing chamber 427, back into secondary exhaust inlet 408. Further advantageously, the configuration disclosed in this figure and throughout this specification can also prevent or minimize back flow when one pressure source is operating and the other is not. For example, if the SPU is not operating, the present configuration may prevent back flow into the SPU bay, even while the main engine is operating.

Also visible in this illustration are hot baffle 432 and cold baffle 436, which are commonly used to mix engine bay air with exhaust air, while blocking backflow into the engine bay from stage 2, and denying external views of the upstream high temperature components such as the engine exhaust duct wall and turbine discharge disk. (Note that in at least some prior art instances, because there is no stage that mixes primary engine exhaust with SPU exhaust, the mixing of engine bay air with the primary exhaust would be considered "stage 1" of the exhaust system.) The hot and cold baffles blocking line-of-sight to upstream components is a primary function of hot part IR signature control while providing the various exhaust and coolant air mixing in an efficient manner. The cooling air flows also protect the IRS sidewalls and component from increasing in temperature due to the separate and combined high temperature exhaust flows of the primary and secondary exhausts. Maintaining low surface temperatures while controlling and combining the exhaust flows is critical to achieving the IRS effectiveness in reducing IR signature while directing the engine exhaust plumes for the aircraft.

Asymmetrical exhaust 470 is housed within extender 440 (see FIG. 4), and may be necessary to meet form factor and other fit requirements for certain installations. This asymmetrical structure can create significant temperature gradients, which may be a concern in cases where it is desirable to reduce the overall IR signature of the system. In some embodiments, to reduce temperature gradients, this asymmetrical third stage may be cooled by air from another source, such as a from an oil cooler compartment and/or ambient air.

FIGS. 6A and 6B illustrate details of flow integrator 424. Specifically, in this cutaway side view, it is seen that integrator ports 428 engages with secondary exhaust inlet 408, and that flow integrator 424 provides a "scissor structure" 442. The flow integrator directs exhaust flows out and around the blocking baffles with minimal back flow increases, yet prevents the flow of exhaust gases to back flow through the SPU exhaust from the main engine exhaust in the event that the SPU is off or at a reduced power setting. Flow integrator 424 is designed and shaped to have a gradual change in cross-sectional area, and limited turns in the combining flows as the flows are directed through the exhaust system. Conversely, a backward flow observes a substantial increase in resistance pressure in the opposite direction due to sharp turns and adverse area ratio changes, which makes it more desirable from a flow standpoint to maintain flow in the desired exit direction instead of back into either the primary or secondary engine separate exhausts. This prevents flow going back from integrator 424 into the 404 or 408 ducts, and to their respective engine components.

Flow integrator 424 receives two separate exhaust streams, plus a cooling air flow, which could be pressurized or non-pressurized air from a source such as a bay or the ambient air. As discussed above, it is desirable to mix these streams, but mixing may be complicated by the differences in temperature, pressure, and/or vector mechanics in these flows. Thus, in at some embodiments, flow integrator 424 provides scissor structure 442, which may be in a "nested chute" configuration. As can be seen, scissor structure 442 includes both inner chutes 423 and outer chutes 425.

Inner chutes 423 have ingress interfaces that fluidly couple to a first exhaust source, while the egress interfaces direct an airstream upward and around the baffles of FIG. 4. Outer chutes 425 wrap around inner chutes 423, with an air gap. This air gap acts as the egress interface for outer chutes 425, which also have an ingress interface fluidly coupled to a second exhaust source. Air from a third source (e.g., cool ambient or bay air) may flow around scissor structure 442. These three airflows can then mix in stage two, with minimum danger of back flow into any of the exhaust streams. The first exhaust airflow, second exhaust airflow, and cooling airflow are all directed around the baffle together, changing the vector mechanics of each so that they are flowing substantially in the same direction together (i.e., the direction of the mixing), which eases mixing.

It should be noted that integrator port 428 could be one of multiple, discrete integrator ports (e.g., a single port for each scissor structure 442), or a "multiport" configuration. In a multiport configuration, a port would span two or more scissor structures, up to and including all scissor structures.

FIG. 6B provides a perspective view of flow integrator 424. In this case, integrator port 428 is a multiport configuration that spans the entire scissor structure array. This view is better understood with reference also to FIG. 7 below.

Figure 7:
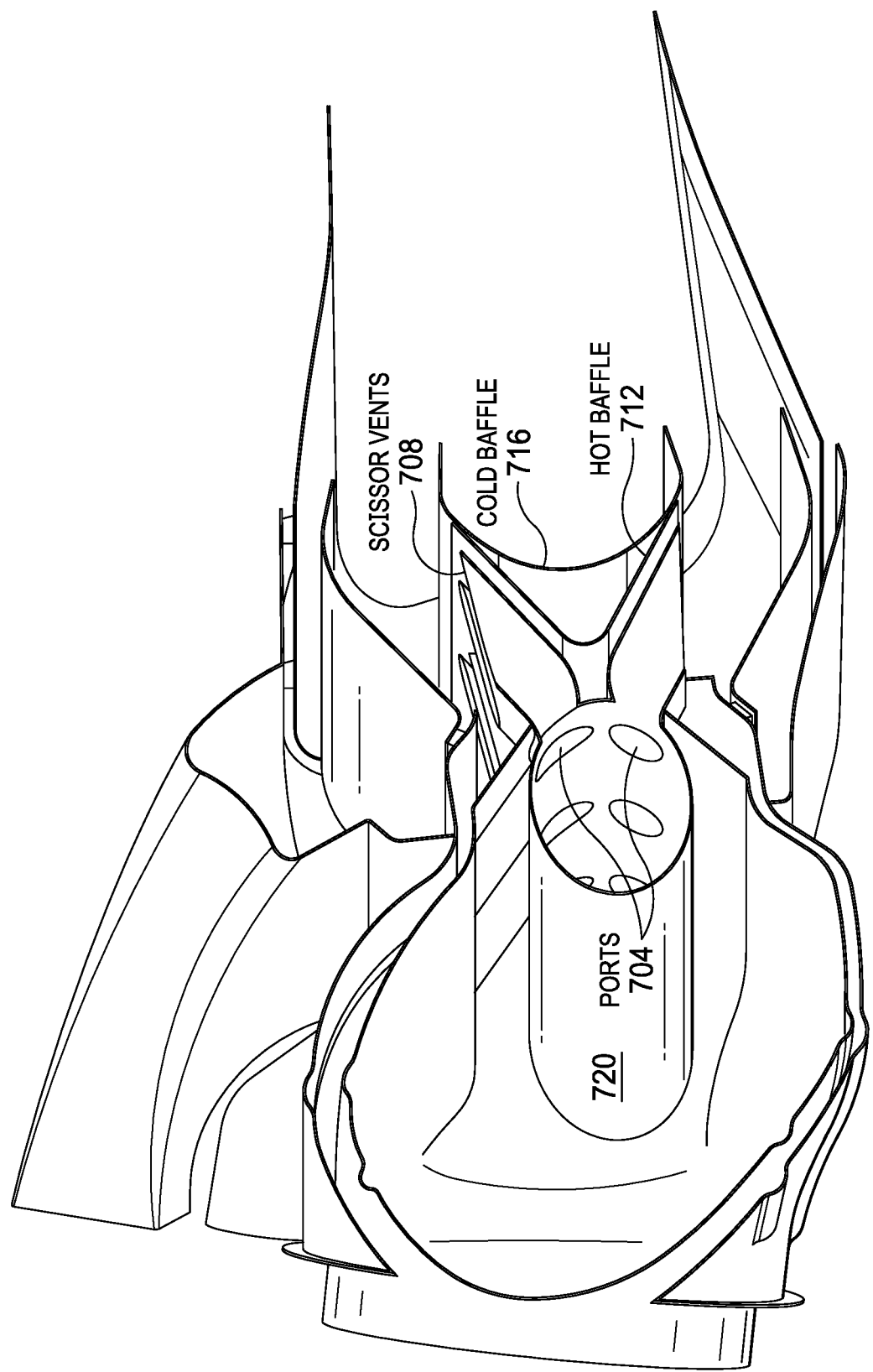
FIG. 7 is a cutaway perspective view illustration of an example flow integrator.

FIG. 7 illustrates a cutaway perspective view of the flow integrator. In this view, discrete ports (both upper and lower) direct exhaust gases to scissor vents 708. Secondary exhaust flows into exhaust inlet 720, and then out of ports 704 into scissor vents 708, which direct exhaust upward and downward at a gradual angle. In this embodiment, the scissor structure includes a plurality of discrete scissor vents with respective discrete ports. As described above, in other embodiments, a "multiport" configuration could be provided in which continuous top and bottom ports 704 respectively span the width (or a portion of the width) of exhaust inlet 720. In that case, unitary scissor vents 708 that also span the width (or a portion of the width) of exhaust inlet 720 may also be provided.

The combined primary and SPU exhaust gases flow up over and under the hot baffle 712, and mix with cooler air, such as air from one or more engine bays. The hot baffle prevents hot exhaust gases from striking the cold baffle 716 directly.

Figure 8:
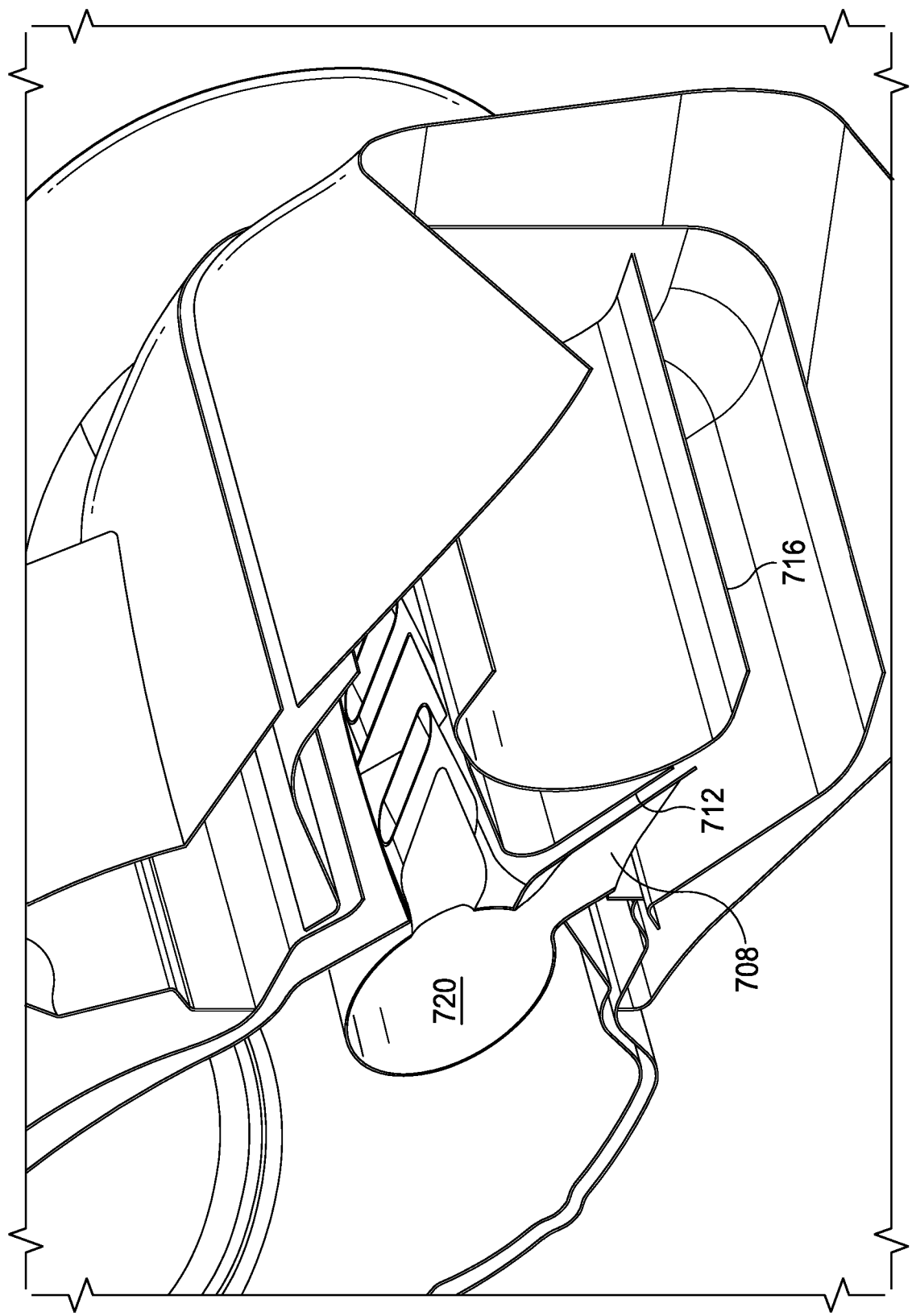
FIG. 8 is an alternate perspective view of an example flow integrator.

FIG. 8 illustrates the same structure from a different perspective view.

Figure 9:
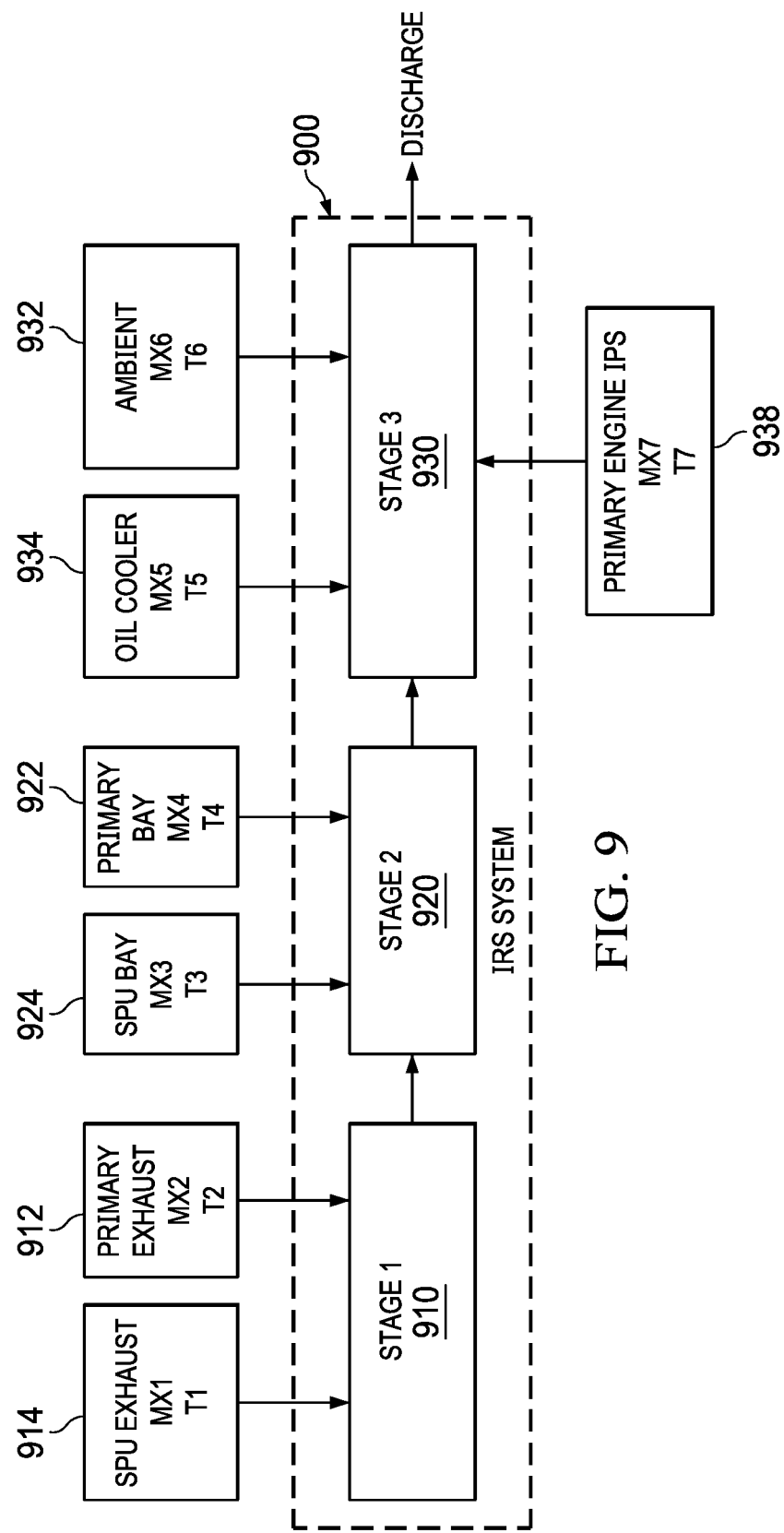
FIG. 9 is a block diagram illustration of the operation of an example multistage IRS exhaust system.

FIG. 9 is a block diagram illustration of the operation of an example multistage IRS exhaust system 900. In the example of FIG. 9, the stages are represented as stage 1 910, stage 2 920, and stage 3 930.

Stage 1 receives two exhaust flows, namely primary exhaust 912 and SPU exhaust 914. In this illustration, it is seen that primary exhaust 912 and SPU exhaust 914 have different temperature-pressure-flow rate profiles.

In stage 1, as illustrated above, air from the primary exhaust and SPU exhaust is mixed and tends toward an intermediate temperature and pressure value between the two exhaust flows.

In stage 2, this intermediate air is mixed with yet cooler air from other sources, such as SPU bay 924 and primary engine bay 922. Within stage 2, these air sources are mixed with the intermediate exhaust from the stage 1 output, and tend toward a second intermediate value that is lower than the first intermediate value.

The output exhaust of stage 2 is provided to stage 3 930. This could include air from ambient air inlet 932 and/or lower temperature air from an oil cooler flow and/or environmental cooling system coolant air flow discharge, or another liquid cooling solution, such as 934. Furthermore, air from an IPS could also be mixed in for further cooling.

Within stage 3, this mix of air and cooling further cools the exhaust air, until it is discharged from the exhaust system at a third intermediate temperature and pressure.

The flowcharts and diagrams in the FIGURES illustrate the architecture, functionality, and operation of possible implementations of various embodiments of the present disclosure. It should be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Embodiments of the teachings of the present specification may include the following nonlimiting examples, substantially as described.

There is disclosed in one example a multistage infrared suppression exhaust system for an aircraft, comprising: a stage one comprising a first exhaust conduit to receive a first exhaust air flow at a first temperature-pressure product $T_1P_1$, a second exhaust conduit to receive a second exhaust air flow at a second temperature-pressure product $T_2P_2$, and a flow integrator mechanically configured to mix the first exhaust air flow with the second exhaust air flow in an integration chamber while preventing back flow into the second exhaust conduit; and a stage two comprising a stage two cooling airflow to cool the mixed first and second exhaust air flows.

There is further disclosed an example multistage infrared suppression exhaust system, wherein $T_1P_1$ is sufficiently different from $T_2P_2$ that the first exhaust airflow cannot mix directly with the second exhaust airflow.

There is further disclosed an example multistage infrared suppression exhaust system, wherein $T_1P_1$ is at least approximately two times $T_2P_2$.

There is further disclosed an example multistage infrared suppression exhaust system, wherein the second exhaust conduit is oriented substantially perpendicular to the first exhaust conduit and the flow integration chamber.

There is further disclosed an example multistage infrared suppression exhaust system, wherein the flow integrator comprises an array of vented scissor structures.

There is further disclosed an example multistage infrared suppression exhaust system, wherein the vented scissor structures are discretely vented.

There is further disclosed an example multistage infrared suppression exhaust system, wherein the vented scissor structures are multi-ported.

There is further disclosed an example multistage infrared suppression exhaust system, wherein the first exhaust conduit is mechanically adapted to couple to a primary engine of the aircraft.

There is further disclosed an example multistage infrared suppression exhaust system, wherein the second exhaust conduit is mechanically adapted to couple to a secondary engine of the aircraft.

There is further disclosed an example multistage infrared suppression exhaust with the ability to function with either primary exhaust or secondary power unit exhaust off due to an engine off condition.

There is further disclosed an example multistage infrared suppression exhaust system, further comprising a first stage outer encasement that circumscribes a first stage inner encasement with an air gap, the first stage outer encasement mechanically adapted to receive an insulating airflow, the insulating airflow having a temperature substantially less than $T_1$.

There is further disclosed an example multistage infrared suppression exhaust system, wherein the insulating airflow comprises engine bay airflow.

There is further disclosed an example multistage infrared suppression exhaust system, wherein the insulating airflow provides cooling air for stage two.

There is further disclosed an example multistage infrared suppression exhaust system, wherein the stage two cooling airflow comprises at least one of the primary or secondary engine bay airflow.

There is further disclosed an example multistage infrared suppression exhaust system, further comprising a stage three to cool air output at stage two with an ambient airflow.

There is further disclosed an example multistage infrared suppression exhaust system, wherein stage three further comprises an oil cooler discharge air coolant flow.

There is further disclosed an example multistage infrared suppression exhaust system, wherein stage three further comprises an inlet for cooling air from an integrated particle separator (IPS).

There is also disclosed an example rotary aircraft, comprising: an airframe; a rotor; a primary engine bay comprising a primary engine to drive the rotor; a secondary power unit (SPU) bay comprising an SPU; and an exhaust system coupled to the primary engine exhaust and SPU exhaust, comprising: a first exhaust inlet to receive the primary engine exhaust, and a second exhaust inlet to receive the secondary engine exhaust, and an exhaust integrator having a nested chute structure to integrate the secondary engine exhaust with the primary engine exhaust; and conduits to receive air from the primary engine bay and SPU bay, and to mix the air with the integrated exhaust.

There is further disclosed an example rotary aircraft, further comprising hot and cold baffles, the cold baffle disposed to receive flow of the air, and to not receive the integrated exhaust directly, and the hot baffle disposed to impede the integrated exhaust from striking the airframe.

There is further disclosed an example rotary aircraft, wherein the exhaust system is located on a port side of the airframe.

There is further disclosed an example rotary aircraft, wherein the exhaust system is located on a starboard side of the aircraft.

There is further disclosed an example rotary aircraft, wherein the primary engine exhaust has a mechanical vector different from a mechanical vector of the secondary engine exhaust.

There is further disclosed an example rotary aircraft, wherein the exhaust integrator comprises an exhaust integration chamber, comprising first and second conduits, wherein the second conduit is oriented substantially perpendicular to the first conduit.

There is further disclosed an example rotary aircraft, wherein the exhaust integrator comprises an array of vented scissor structures.

There is further disclosed an example rotary aircraft, wherein the vented scissor structures are discretely vented.

There is further disclosed an example rotary aircraft, wherein the vented scissor structures are multi-ported.

There is further disclosed an example rotary aircraft, wherein the first conduit is mechanically adapted to couple to a primary engine of the rotary aircraft.

There is further disclosed an example rotary aircraft, wherein the second conduit is mechanically adapted to couple to a secondary engine of the rotary aircraft.

There is further disclosed an example rotary aircraft, further comprising a first stage outer encasement that circumscribes a first stage inner encasement with an air gap, the first stage outer encasement mechanically adapted to receive an insulating airflow, the insulating airflow having a temperature substantially less than an exhaust flow temperature.

There is further disclosed an example rotary aircraft, wherein the insulating airflow comprises engine bay airflow.

There is further disclosed an example rotary aircraft, wherein the insulating airflow provides cooling air for the second stage.

There is further disclosed an example rotary aircraft, wherein the second stage received air comprises at least one of the primary or secondary engine exhaust.

There is further disclosed an example rotary aircraft, further comprising a third stage to cool air output at the second stage with an ambient airflow.

There is further disclosed an example rotary aircraft, wherein the third stage further comprises an oil cooler discharge flow.

There is further disclosed an example rotary aircraft, wherein the third stage further comprises an inlet for cooling air from an integrated particle separator (IPS).

There is also disclosed an example method of providing integrated exhaust for an aircraft having first and second exhaust sources, comprising: receiving a first exhaust flow from the first exhaust source, the first exhaust flow having a temperature-pressure profile $T_1P_1$; receiving a second exhaust flow from the second exhaust source, the second exhaust flow having a temperature-pressure profile $T_2P_2$; integrating the first and second exhaust flows to an integrated exhaust flow having a temperature-pressure profile $T_3P_3$; mixing the integrated exhaust flow with first cooling air to provide a cooled exhaust flow having a temperature-pressure profile $T_4P_4$; mixing the cooled exhaust flow with a second cooling air to provide a final cooled exhaust flow having a temperature-pressure profile $T_5P_5$; and expelling the final cooled exhaust flow away from the rotary aircraft.

There is further disclosed an example method, wherein $T_1P_1$ is sufficiently different from $T_2P_2$ that the first exhaust flow cannot mix directly with the second exhaust flow.

There is further disclosed an example method, wherein $T_1P_1$ is at least approximately two times $T_2P_2$.

There is further disclosed an example method, further comprising insulating the integrated exhaust with an airflow having a temperature substantially less than $T_1$.

There is further disclosed an example method, wherein the airflow having a temperature substantially less than $T_1$ comprises engine bay air and/or secondary power unit (SPU) bay air.

There is further disclosed an example method, wherein the insulating airflow provides cooling air for integrating the first and second exhaust flows.

There is further disclosed an example method, further comprising integrating the first and second exhaust flows with a cool air output with an ambient airflow.

There is further disclosed an example apparatus comprising means for performing the method of a number of the above examples.

There is further disclosed an example apparatus, wherein the means for performing the method comprise a multistage infrared suppression exhaust system.

There is also disclosed an example multi-stage exhaust cooling system, comprising: a first exhaust inlet to receive a first airflow from a first exhaust source, the first airflow having a first mechanical vector and a first temperature; a second exhaust inlet to receive a second airflow from a second exhaust source, the second airflow having a second mechanical vector and a second temperature; a first stage comprising airflow integration means to integrate the first airflow with the second airflow into a first-stage airflow having a third temperature between the first temperature and the second temperature, the airflow integration means comprising means to prevent back airflow; a second stage comprising means to mix the first-stage airflow with a first cool air source, the first cool air source having a fourth temperature lower than the third temperature, to provide a second-stage airflow having a fifth temperature between the third temperature and the fourth temperature.

There is further disclosed an example multi-stage exhaust cooling system, further comprising a third stage comprising means to mix the second-stage airflow with a second cool air source, the second cool air source having a sixth temperature, to provide a third-stage airflow having a seventh temperature between the fifth temperature and the sixth temperature.

There is further disclosed an example multi-stage exhaust cooling system, wherein the integration means comprise means to prevent back airflow into at least one of the first exhaust source and second exhaust source, when the at least one exhaust source is not operating.

There is further disclosed an example multi-stage exhaust cooling system, further comprising a pressurized cool air source.

There is further disclosed an example multi-stage exhaust cooling system, further comprising means to provide convective or film cooling via the pressurized cool air source.

There is further disclosed an example multi-stage exhaust cooling system, wherein the integration means comprise a nested chute mixer.

There is further disclosed an example multi-stage exhaust cooling system, wherein the nested chute mixer is mechanically configured so that one airflow substantially surrounds the other airflow.

There is further disclosed an example multi-stage exhaust cooling system, wherein the nested chute mixer comprises an array of vented scissor structures.

There is further disclosed an example multi-stage exhaust cooling system, wherein the array is linear.

There is further disclosed an example multi-stage exhaust cooling system, wherein the array comprises dual arrays arranged as parallel mirror images.

There is further disclosed an example multi-stage exhaust cooling system, wherein the airflow integration means are to direct the first airflow, second airflow, and a cooling airflow substantially into a common direction.

There is further disclosed an example multi-stage exhaust cooling system, further comprising convective cooling means.

There is further disclosed an example multi-stage exhaust cooling system, further comprising film cooling means.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this specification, references to various features included in "one embodiment," "example embodiment," "an embodiment," "another embodiment," "certain embodiments," "some embodiments," "various embodiments," "other embodiments," "alternative embodiment," and the like are intended to mean that any such features are included in one or more embodiments of the present disclosure, but may or may not necessarily be combined in the same embodiments.

As used herein, unless expressly stated to the contrary, use of the phrase "at least one of," "one or more of" and "and/or" are open ended expressions that are both conjunctive and disjunctive in operation for any combination of named elements, conditions, or activities. For example, each of the expressions "at least one of X, Y and Z," "at least one of X, Y or Z," "one or more of X, Y and Z," "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first," "second," "third," etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of," "one or more of," and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A multistage infrared suppression exhaust system for an aircraft, comprising:
    a stage one comprising a first exhaust conduit extending along a first direction to receive a first engine exhaust air flow from a first engine at a first temperature-pressure product T1P1, a second exhaust conduit to receive a second engine exhaust air flow from a second engine at a second temperature-pressure product T2P2, and a flow integrator; and
    wherein the first exhaust conduit terminates in a mixing chamber;
    wherein the second exhaust conduit is disposed in the first engine exhaust air flow within the first exhaust conduit, the second exhaust conduit extending along a second direction perpendicular to the first direction of the first exhaust conduit, wherein the second exhaust conduit is defined by an elliptical cylindrical enclosure, with a plurality of integrator ports formed through the enclosure; and
    wherein the flow integrator comprises a plurality of angled chutes disposed to direct the second exhaust air flow from the plurality of integrator ports into the mixing chamber to form a mixed airflow comprising the first and second exhaust air flows, the angled chutes being oblique relative to the first direction of the first exhaust conduit; and
    a stage two comprising a stage two cooling airflow to cool the mixed first and second exhaust air flows.

2. The multistage infrared suppression exhaust system of claim 1, wherein T1P1 is at least two times T2P2.

3. The multistage infrared suppression exhaust system of claim 1, wherein the angled chutes of the flow integrator comprises an array of vented scissor structures.

4. The multistage infrared suppression exhaust system of claim 3, wherein the array of vented scissor structures comprises vented scissor structures that are discretely vented such that each integrator port communicates with a respective scissor structure.

5. The multistage infrared suppression exhaust system of claim 3, wherein the array of vented scissor structures comprises vented scissor structures that are multi-ported.

6. The multistage infrared suppression exhaust system of claim 1, wherein the first exhaust conduit is mechanically adapted to couple to the first engine, which is a primary engine of the aircraft.

7. The multistage infrared suppression exhaust system of claim 6, wherein the second exhaust conduit is mechanically adapted to couple to the second engine, which is a secondary engine of the aircraft.

8. The multistage infrared suppression exhaust system of claim 1, further comprising a first stage outer encasement that circumscribes the first exhaust conduit with an air gap, the first stage outer encasement mechanically adapted to receive an insulating airflow, the insulating airflow having a temperature substantially less than T1.

9. The multistage infrared suppression exhaust system of claim 8, wherein the insulating airflow comprises engine bay airflow.

10. The multistage infrared suppression exhaust system of claim 8, wherein the stage two cooling airflow comprises the insulating airflow.

11. The multistage infrared suppression exhaust system of claim 1, wherein the stage two cooling airflow comprises at least one of a primary engine bay airflow or a secondary engine bay airflow of the first engine and the second engine, respectively.

12. The multistage infrared suppression exhaust system of claim 1, further comprising a stage three to cool air output at stage two with an ambient airflow.

13. A rotary aircraft, comprising:
an airframe;
a rotor;
a primary engine bay comprising a primary engine to drive the rotor;
a secondary power unit (SPU) bay comprising an SPU; and
an exhaust system coupled to receive a primary engine exhaust and an SPU exhaust, comprising:
a first exhaust inlet of a first exhaust conduit extending along a first direction, to receive the primary engine exhaust from the primary engine bay at a first temperature and pressure, wherein the first exhaust conduit terminates in a mixing chamber,
a second exhaust inlet of a second exhaust conduit to receive the SPU exhaust from the SPU bay at a second temperature and pressure, wherein the second exhaust conduit is defined by an elliptical cylindrical enclosure disposed within the primary engine exhaust within the first exhaust conduit, the second exhaust conduit extending along a second direction perpendicular to the first direction of the first exhaust conduit, and a plurality of integrator ports being formed through the enclosure, and
an exhaust integrator, wherein the exhaust integrator comprises a plurality of angled chutes disposed to direct the SPU exhaust from the plurality of integrator ports into the mixing chamber to form an integrated exhaust comprising the primary engine exhaust and the SPU exhaust, the angled chutes being oblique relative to the first direction of the first exhaust conduit.

14. The rotary aircraft of claim 13, further comprising hot and cold baffles, the cold baffle disposed to receive the integrated exhaust indirectly, and the hot baffle disposed to impede the integrated exhaust from striking the cold baffle, directly.

15. The rotary aircraft of claim 13, wherein the exhaust system is located on a port side of the airframe.

16. The rotary aircraft of claim 13, wherein the exhaust system is located on a starboard side of the rotary aircraft.

17. The rotary aircraft of claim 13, wherein the primary engine exhaust has a mechanical vector different from a mechanical vector of the SPU exhaust.

18. A multi-stage exhaust cooling system, comprising:
a first exhaust inlet of a first exhaust conduit extending along a first direction, to receive a first airflow from a first exhaust source comprising a first engine, the first airflow having a first mechanical vector and a first temperature, wherein the first exhaust conduit terminates in a mixing chamber;
a second exhaust inlet extending along a second direction, to receive a second airflow from a second exhaust source comprising a second engine, the second airflow having a second mechanical vector and a second temperature, wherein the second exhaust conduit is disposed in the first airflow within the first exhaust inlet, the second direction is perpendicular to the first direction of the first exhaust conduit, and the second exhaust conduit is defined by an elliptical cylindrical enclosure, with a plurality of integrator ports formed through the enclosure;
a first stage comprising an airflow integrator to integrate the first airflow with the second airflow into a first-stage airflow having a third temperature between the first temperature and the second temperature, the airflow integrator comprising a plurality of angled chutes disposed to direct the second airflow from the plurality of integrator ports into the mixing chamber to form a mixed airflow comprising the first and second airflows, the angled chutes being oblique relative to the first direction of the first exhaust conduit; and
a second stage, wherein the first-stage airflow is mixed with air from a first cool air source, the first cool air source having a fourth temperature lower than the third temperature, to provide a second-stage airflow having a fifth temperature between the third temperature and the fourth temperature.

19. The multi-stage exhaust cooling system of claim 18, further comprising a third stage, wherein the second-stage airflow is mixed with air from a second cool air source, the second cool air source having a sixth temperature, to provide a third-stage airflow having a seventh temperature between the fifth temperature and the sixth temperature.

20. The multi-stage exhaust cooling system of claim 18, further comprising a third cool air source.

21. The multi-stage exhaust cooling system of claim 20, wherein air from the third cool air source provides convective or film cooling.

22. The multi-stage exhaust cooling system of claim 18, wherein the angled chutes of the airflow integrator form a nested chute mixer.

23. The multi-stage exhaust cooling system of claim 22, wherein the nested chute mixer is mechanically configured so that the first airflow substantially surrounds the second airflow.

24. The multi-stage exhaust cooling system of claim 22, wherein the angled chutes of the nested chute mixer are arranged as an array of vented scissor structures.

25. The multi-stage exhaust cooling system of claim 24, wherein the array is linear.

26. The multi-stage exhaust cooling system of claim 24, wherein the array comprises dual arrays arranged as parallel mirror images.

27. An apparatus for an aircraft, comprising:
a first exhaust conduit extending along a first direction to receive a first exhaust flow from a first exhaust source comprising a first engine, the first exhaust flow having a temperature-pressure profile T1P1, and flowing in the first direction, wherein the first exhaust conduit terminates in a mixing chamber;
a second exhaust conduit extending along a second direction to receive a second exhaust flow from a second exhaust source comprising a second engine, the second exhaust flow having a temperature-pressure profile T2P2, and flowing in the second direction perpendicular to the first direction,
wherein the second exhaust conduit is disposed in the first exhaust air flow within the first exhaust conduit, and is defined by an elliptical cylindrical enclosure, with a plurality of integrator ports formed through the enclosure;
a first stage comprising a flow integrator to integrate the first and second exhaust flows to an integrated exhaust flow having a temperature-pressure profile T3P3,
wherein the flow integrator comprises a plurality of angled chutes disposed to direct the second exhaust flow from the plurality of integrator ports into the mixing chamber to form a mixed airflow comprising the first and second exhaust flows,
the angled chutes being oblique relative to the first direction of the first exhaust conduit;
a second stage that mixes the integrated exhaust flow with a first cooling air to provide a cooled exhaust flow having a temperature-pressure profile T4P4;
a third stage that mixes the cooled exhaust flow with a second cooling air to provide a final cooled exhaust flow having a temperature-pressure profile T5P5; and
a fourth stage that expels the final cooled exhaust flow away from the aircraft.

28. The apparatus of claim 27, further comprising an insulating airflow having a temperature substantially less than T1 to insulate the integrated exhaust.

* * * * *